No. 714,896. Patented Dec. 2, 1902.
B. M. W. HANSON.
THRUST BEARING FOR COLLETS.
(Application filed July 17, 1902.)
(No Model.)
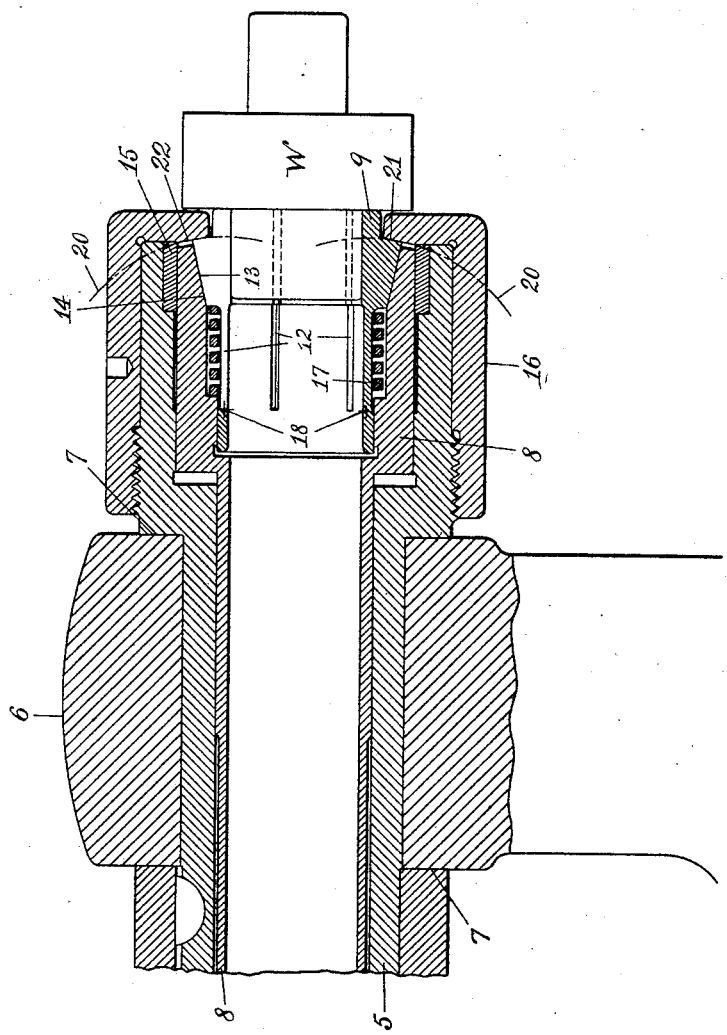
Witnesses:
H. Mallner
Joseph Merritt
Inventor
B. M. W. Hanson
By Wm H Honiss, Atty.
THE NORRIS PETERS CO., PHOTO-LITHO., WASHINGTON, D. C.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

THRUST-BEARING FOR COLLETS.

SPECIFICATION forming part of Letters Patent No. 714,896, dated December 2, 1902.

Application filed July 17, 1902. Serial No. 115,955. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Thrust-Bearings for Collets, of which the following is a full, clear, and exact specification.

This invention relates to improvements in the collet or spindle chucks usually employed in connection with watch-lathes, screw-machines, and other machinery of that class in which the collet is split for a considerable portion of its length to form flexible jaws, which are closed upon the work by the coöperation of two beveled or conical surfaces, one of which is moved longitudinally when it is desired to operate the collet. The jaws are usually sprung open slightly before being hardened, so that they have a tendency to spring outwardly and release themselves from the work when permitted to do so by the surrounding conical closing member.

It was formerly the practice to make the coöperating closing member of the collet in a fixed or integral relation with the spindle and to open and close the collet by moving it longitudinally therein by means of a plunger extending through the spindle to the rearward end thereof. It was found, however, that this longitudinal movement was objectionable inasmuch as the collet would be moved to different longitudinal positions in gripping different pieces through variations in the amount of pressure applied to the plunger, the effect being to hold the successive pieces in different longitudinal positions, and thereby cause variations in the longitudinal dimensions of the finished work. It was then sought to remedy this difficulty by maintaining the collet in a fixed longitudinal position by means of the spindle or a thrust member appurtenant thereto and by imparting the longitudinal movement to the coöperating conical shell; but all such forms of this attempted remedy hitherto known to me have failed in the complete attainment of their object because of the circumstance that the thrust-shoulder relied upon to maintain the collet against longitudinal movement has been disposed at right angles to the axis of the spindle and collet, being thereby to a greater or less extent out of coincidence with the swinging movement of the coengaging shoulder of the collet, according to the diameter of that shoulder, or, more strictly speaking, according to its relation to the points of flexure of the jaws.

In this invention I fully attain what has hitherto only been partially attained by disposing the coengaging thrust-surfaces of the collet and of its thrust-sustaining member in substantial coincidence with the arc described by the corresponding portion of each jaw as it swings toward and from the surface of the work to be clamped, thereby not only securing great accuracy in the work, but also lessening the power required to open and close the collet, since the extra force required to move the collet and the work longitudinally is not only undesirable, but is wasted effort.

This invention is illustrated in the accompanying drawing, which shows a side view, in longitudinal section, of a spindle and collet device in gripping position upon a piece of work.

The main spindle 5 is mounted to rotate in a bearing 6 of the lathe or other machine in which this invention is employed, the customary thrust collar or shoulder 7 being employed to prevent longitudinal movement of the spindle. The main spindle is bored out to receive the collet-plunger 8, which extends rearwardly through the end of the spindle and is operated therefrom by a lever or cam or in any convenient way. The front end of the plunger is bored concentrically to receive the collet 9 and maintain it in concentric relation with the spindle. The collet here shown is of the usual well-known form and is preferably hardened and ground accurately to fit the work W. The front end of the collet is made contractible by splitting it longitudinally, as shown at 12, thus forming flexible jaws the front ends of which are closed upon the work by means of the beveled or conical annular surface 13 engaging with a similarly beveled or coned surface 14 of the collet, the closing movement being imparted by pushing the plunger 8 forwardly, thus contracting the forward end of the collet. In order to sustain the outward pressure and the wear at the forward end of the spindle due to the pressure and friction of closing the collet, a hardened collar 15 is preferably seated in the front end of the spindle 5, and in order to sustain the collet longitudinally against the forward pressure of the plunger 8 a cap 16 is screwed upon the outside of the forward end of the spindle.

The collet 9 is held forward by means of a coiled spring 17, which encircles the collet and bears against opposing shoulders of the collet and the plunger 8, so that the collet is held forward as the plunger is drawn back, thereby permitting the jaws to spring open and also maintaining the contact between the thrust-shoulders 21 and 22.

Up to this point the device is of well-known construction. It has, however, been customary hitherto, as above stated, to form the coengaging thrust-shoulders 21 and 22 of the collet 9 and the cap 16 at right angles with the axis of the collet, presumably because of the natural but mistaken idea that such a disposition of the thrust-shoulder was most suitable for preventing longitudinal movement. The error will be apparent upon consideration that the direction of movement of these particular portions of the collet-jaws is not directly at right angles with the axis, but has a swinging or arc movement from a center located at the point of flexure of the jaw, which in the case now before us would be approximately at the point indicated by the crosses 18, from which the arcs 20 are struck. This departure of the actual direction of movement of the thrust-shoulder from a plane at right angles with the axis increases with the increasing diameter of the shoulder and its relation to the point of flexure of the jaws, as will be seen by following the arcs 20 outwardly. Hence my present improvement consists in disposing the coengaging surfaces 21 and 22 of the collet 9 and the thrust member or cap 16 in substantial conformity with the arcs 20, representing the direction of swing of those surfaces. The disparity between these shoulders and shoulders disposed at right angles with the axis of the collet and also the differences in effect between the operations of the two shoulders will be evident from the drawing. If the coengaging shoulders 21 were at right angles with the axis of the collet instead of being in coincidence with the arcs 20, the closing movement of the collet must necessarily force it rearwardly to the left, thereby carrying with it the work W to a corresponding extent and varying the longitudinal position of the successive pieces of work according to variations in the diameters of the work or according to the presence of dirt or anything affecting the closing movement of the collet. The use of a collet thus mounted and arranged makes it now possible to do work in machines of the class referred to with the degree of accuracy and uniformity required for closely interchangeable work. The end of the collet being invariable as to longitudinal position may be relied upon as a gage against which a shoulder of each piece of work may be pushed, as herein shown, and the turning or grinding tools for the outer end of the piece and for the remaining shoulder or shoulders may be set at their required distances from the end of the collet with the certainty that the longitudinal dimensions will be exact and unvarying on all pieces. When these collets are employed for holding pieces of work which are fairly uniform in diameter, the shoulders 21 and 22 need not be curved in perfect coincidence with the arcs 20, but may be beveled in tangential relation to the corresponding portions of those arcs, especially where the shoulders are comparatively narrow.

I claim as my invention—

1. The combination of a collet, provided with a jaw which opens and closes with a swinging movement, and a thrust-sustaining member for the jaw, the coengaging surfaces of the jaw and the thrust member being disposed in substantial coincidence with an arc of the swinging movement of the jaw.

2. The combination of a collet provided with jaws which open and close with a swinging movement, a coöperating closing member, and a thrust-sustaining member for the collet, the coengaging surfaces of the thrust member and the collet being disposed in substantial coincidence with an arc of the swinging movement of the collet-jaws.

3. The combination of a collet provided with jaws which open and close with a swinging movement, having a conical surface for coöperating with a closing member, and having a shoulder for the counterthrust adjacent to the larger end of the conical surface, and a thrust member for engaging with the said shoulder, the coengaging surfaces of the shoulder and the thrust member being disposed in substantial coincidence with the arc described by the swinging shoulder.

In testimony whereof I have signed my name to this specification, in the presence of two subscribing witnesses, this 11th day of July, 1902.

BENGT M. W. HANSON.

Witnesses:
JAS. W. GREEN,
E. F. LA PORTE.